May 18, 1943  F. J. CONVERSE  2,319,299
MEANS OF MEASURING LOADS
Filed Oct. 18, 1939

INVENTOR.
Frederick J. Converse,
BY
ATTORNEY.

Patented May 18, 1943

2,319,299

UNITED STATES PATENT OFFICE 2,319,299

MEANS OF MEASURING LOADS

Frederick J. Converse, Pasadena, Calif.

Application October 18, 1939, Serial No. 300,001

5 Claims. (Cl. 265—1)

My invention relates generally to the accurate measurement of relatively large loads, and more particularly to a means in which the deflection of a simple beam is used to indicate the amount of load.

In testing and in construction work, it is often necessary to know the amount of load which is or will be applied to a certain member; and when these loads are of relatively large magnitude, it is difficult to measure them accurately in the field under actual operating conditions. Many devices are known for accurately measuring large loads in laboratories, but these are bulky and relatively complicated and hence not suitable for use in the field. In addition, many of these devices are adversely affected by changes in temperature which render them unsuitable for use in other than protected locations.

It is, therefore, a major object of my invention to provide a means of accurately measuring relatively large loads in a simple manner.

It is another object of my invention to provide a load-measuring device possessing great inherent stability and suitable for use in any position, such as vertical, horizontal, or inclined, in the laboratory or in the field.

It is a further object of my invention to provide a load-measuring device which is a small, simple, self-contained unit independent of external influences.

It is a still further object of my invention to provide a load-measuring device which can be used with various kinds of load mechanism, such as an ordinary screw jack, hydraulic jack, deadload, lever system, etc.

These and other objects of my invention will become apparent from the following description of a preferred form thereof, and from the accompanying drawing illustrating the same, in which:

Fig. 1 is a plan view of a preferred form of a device embodying my invention,

Fig. 2 is a side elevational view of such a device,

Fig. 3 is a diagrammatic view of a simple unloaded beam,

Fig. 4 is a diagrammatic view of a simple beam, loaded at its center, and

Fig. 5 is a diagrammatic view of a simple beam, loaded at its center and provided with a tangent bar.

Referring now to the drawing, and particularly to Figs. 3, 4, and 5 thereof, the numeral 10 indicates a simple beam, supported by knife edges 11 and 12. The ends of the beam 10 extend a short distance beyond the supports 11 and 12, so that when the beam is loaded there will be no possibility of the beam slipping from its supports. When a load P is applied to the beam at its center, the central portion of the beam 10 will be deflected downwardly as shown in Fig. 4, the dashed line indicating its original unloaded position. Since the beam 10 is a relatively rigid member, the ends of the beam outside of the supports 11 and 12 are therefore deflected upwardly, their deflection, like that of the center portion of the beam, being proportional to the amount of load carried by the beam. If, now, a rod-like member 13, parallel to the beam 10 in the latter's unloaded position, is attached to a point just outside the support, as for example just to the left of support 11 in Fig. 5, and is otherwise free of the beam and the supports, it will be deflected downwardly when the beam is loaded, but will not be deformed. Under such conditions, the member 13 is tangential to the beam 10 at the point of connection of the two, and the deflection of the member 13 is proportional to the load on the beam. Therefore, the amount of displacement "d" between the right-hand end of the tangent member 13 and the right-hand end of the beam 10 will be a function of the amount of load impressed upon the beam 10. Thus, if a gage or any form of deflection-measuring device is placed so that it will measure the deflection between the ends of the tangent member 13 and the beam 10, its scale may be calibrated in pounds, tons, or other convenient units, and the loads impressed upon the beam 10 thereby read directly.

While the simplified description just given has assumed the use of a concentrated load applied at the center of the beam, it will be understood that the beam may be loaded uniformly or in any other manner which seems advisable and the word "loaded" is to be understood to include all such types of loading so long as the load is applied intermediate of the supports. Throughout this specification and its appended claims, the term "simple beam" is intended to mean a beam supported near each of its ends, and having a load applied to it between the points of support.

In Figs. 1 and 2, I have shown a preferred form of device embodying the principles just discussed. In this preferred form, the numeral 20 indicates a heat-treated steel beam resting on knife-edge supports 21 and 22. These knife edges 21 and 22 form part of, or are attached to, a base 24 which may be provided with handles (not shown) at each end for ease of handling. Bolts 26 and 26a, or other suitable fastening means, loosely hold the beam 20 to the base 24, provision being made of course to prevent any possibility of the bolts binding, so that the beam may be freely deflected.

In my preferred form of device, I provide a U-shaped tangent member 23 attached at its open end to each side of the beam 20 at one end thereof so that the tangent member extends around both sides and the opposite end of the beam. The tangent member 23 is preferably attached to the beam 20 by bolts 27 and by spot welding, the bolts and the welding both being outside of the knife edge 21. By constructing the knife edges 21 and 22 so that they extend only the width of the beam 20, and by spacing the tangent member 23 a small distance from the beam, when the latter is deflected, the tangent member will not bear against or touch the knife edges 21 and 22, and consequently is free to assume its proper tangential position.

On the free or unattached end of the tangent member 23, I prefer to mount a post 30 to which is attached a dial gage 31, disposed so that its operative spindle 32 bears against the corresponding end of the beam 20. In this way, when the beam 20 is loaded, the tangent member 23 is deflected downwardly and carries the gage 31 with it, thus measuring the displacement of the right end of the tangent member from a point on the elastic line of the beam. It will be apparent, of course, that these movements will be comparatively small and in one embodiment of the device constructed by me, a deflection of one one-thousandth of an inch is caused by a load of one unit, such as 100 lb., etc. It is apparent that the end of the gage may bear on any portion of the beam without affecting the principle of operation, although each position requires a different calibration of the gage.

To secure accurate results, means should be provided to insure consistency in loading, and to this end, I prefer to provide a loading block 33 secured in place by straps 34 and 34a attached to the beam 20. The lower surface of the loading block 33 may be provided with knife edges 35 and 35a along the edges thereof extending across the beam 20. The upper surface of the loading block 33 is preferably provided with a recess adapted to receive a hardened steel ball 36 upon which rests a ball cap 37. The form of the loading block may be varied, of course, so long as a method is employed which will insure consistency of loading under all conditions.

In use, the device is placed in position, the load placed upon it in any suitable and convenient manner, and the amount of load read directly on the scale of the gage 31. The device may be used in any position, and in addition, it is practically unaffected by temperature changes, since linear expansion, the greatest hindrance to accuracy in such devices, takes place in a direction at right angles to the deflection measurement, and to all practical intents and purposes does not affect the reading.

From this description, it will be apparent that simple beams of various types may be used, and instead of being uniformly rectangular in cross-section, the beam may be variable in width or thickness, or curved instead of straight. Regardless of the form of beam, however, throughout this specification and its appended claims, the term "elastic line" is to be construed as meaning the curve the beam will assume under load.

Having now described and shown my preferred form of invention, I wish it to be understood that I do not wish to be limited to the particular form or arrangement of parts herein described and shown, which is merely illustrative of the broad principles of my invention as defined by the appended claims.

I claim as my invention:

1. A device for measuring relatively large loads which includes: a base; a simple beam; a support near each end of said beam, for supporting said beam on said base; means holding said beam to said base but not restraining the deflection of said beam; a tangent member rigidly attached to one end of said beam and extending toward the other end thereof; means for indicating the deflection of a point on said tangent member from a suitable point on the elastic line of said beam when said beam is loaded; and means for loading said beam in a consistent manner attached to the face of said beam opposite said supports.

2. A device as described in claim 1 in which said tangent member is attached to said beam just outside one of said supports.

3. A device for measuring relatively large loads which includes: a base; a simple beam; a support near each end of said beam for supporting said beam on said base; a tangent member rigidly attached to one end of said beam and extending toward the other end thereof; means for loading said beam between said supports and in a consistent manner; and means for measuring the deflection of a point on said tangent member from a suitable point on the elastic line of said beam.

4. A device for measuring relatively large loads which includes: a base; a simple beam; a support near each end of said beam for supporting the same on said base; a U-shaped tangent member having its free ends rigidly attached to one end of said beam on opposite faces thereof and its base portion extending around the other end of said beam; a gauge carried by the base portion of said tangent member and adapted to rest on the adjacent end of said beam, whereby deflection of said beam will be registered by said gauge; and means for loading said beam between said supports.

5. A device for measuring relatively large loads which includes: a base; a simple beam; a support near each end of said beam for supporting said beam on said base; a tangent member rigidly attached to one end of said beam and extending toward the other end thereof; and means for measuring the deflection of a point on said tangent member from a suitable point on the elastic line of said beam.

FREDERICK J. CONVERSE.